June 14, 1949.  W. M. URBAIN ET AL  2,473,041
HIGH-FREQUENCY ELECTROSTATIC FIELD
APPARATUS FOR EGG PASTEURIZATION
Filed Aug. 9, 1945

INVENTORS
Walter M. Urbain
Paul Schauert
BY
R. G. Story
ATTORNEY

Patented June 14, 1949

2,473,041

UNITED STATES PATENT OFFICE 2,473,041

HIGH-FREQUENCY ELECTROSTATIC FIELD APPARATUS FOR EGG PASTEURIZATION

Walter M. Urbain, Western Springs, and Paul Schauert, Chicago, Ill., assignors to Swift & Company, Chicago, Ill., a corporation of Illinois Application August 9, 1945, Serial No. 609,772

2 Claims. (Cl. 99—253)

This invention relates to an apparatus for the pasteurization of the meats of eggs and more particularly to the pasteurization of egg meats in their shells, i. e. the pasteurization of shell eggs.

It is an object of this invention to provide an improved sterilizing aparatus for the treatment of egg meats.

Another object of this invention is to provide an apparatus utilizing a high frequency electrostatic field to sterilize shell eggs.

Another object of the invention is to provide an improved condenser structure for distributing an electrostatic field evenly throughout the meat of a shell egg.

Still another object of the invention is to provide a condenser so shaped as to create a high frequency electrostatic field that will pass uniformly through the meat of a shell egg.

Other objects will appear from the description below.

In the past it has been proposed to treat shell eggs by heating them in a bath of oil, water, or air to stabilize the white portion of the egg. It has been found that, if the white is subjected to a temperature in the neighborhood of below 140° F. it retains substantially its original characteristics during storage and does not tend to liquefy and become runny as rapidly as that of an untreated egg. This heat treatment is also known to sterilize an egg meat thus permitting the shell egg to be stored for longer periods without harmful result.

The transfer of heat into the egg as taught by this prior art treatment is accomplished by maintaining a relatively high temperature differential on the outside of the egg until the central portion of the egg is raised to the desired temperature. The use of a water, oil, or air, bath controlled to have a temperature of from 140° F. to 145° F., causes an inward flow of heat from the surface of the egg to the center to perform a complete pasteurization. It has been found that this method of forcing pasteurizing temperatures to prevail in the center of the egg meat of a shell egg, causes partial coagulation of the egg meat and coagulation is particularly noticeable adjacent the outer surface of the shell egg where the higher temperatures prevail.

The use of a fluid bath as required by this process makes for a messy operation and furthermore the transmission of heat from the outside of the shell to the inner phases of the meat of the shell egg requires considerable time. A temperature differential must be maintained to transmit heat to the inside of the egg meat, yet the outside temperature cannot be maintained at too high a level for otherwise an undue proportion of the egg meat would become coagulated. When maintaining the temperature of the bath at around 140° F. a period of upwards of 30 minutes is required to properly treat a shell egg and an air bath requires an even longer time because of the relatively inefficient transfer of heat from a gas to a solid.

This older method of treating eggs has considerable commercial importance and even though there are certain objections to its use, they are considered to be of negligible importance in proportion to the advantage derived from the practice of preserving the meats of shell eggs by pasteurizing them with heat. The partial coagulation encountered is undesirable but does not render the process inoperative when the egg is to be subsequently used for cooking purposes. The time consumed in heat treating the eggs as taught by the method of using an oil, water, or air, bath can be justified in view of the longer keeping qualities imparted to shell eggs and the method finds particular application in the preparation of shell eggs for storage under adverse conditions.

The present invention provides an improvement over this prior art teaching and has been found to overcome all of the objectionable features inherent in it. In using the invention herein disclosed, the egg meat of the shell egg may be quickly heated throughout without coagulation and without requiring the use of a treating bath to drive heat into the egg meat. This is done by creating a dielectric effect in the egg meat of a shell egg by means of a high frequency electrostatic field to produce heat within the egg meat and since the heat is produced substantially simultaneously throughout all portions of the dielectric disposed in the field, the temperature of the egg meat is raised without unduly heating any one portion before the remainder is up to the pasteurizing temperature. When subjecting the egg meat to the heating effect produced in a dielectric by a high frequency electrostatic field, a temperature differential is not required to transmit heat to all portions of the egg meat and thus the temperature throughout the entire egg meat can be controlled to meet the optimum conditions. By using this means to heat an egg meat it has been found that the egg meat positioned in its shell may be pasteurized efficiently at temperatures below that which causes perceptible coagulation and an efficient control of the pasteurization process can be had.

In addition, not only to stabilizing the egg white so that it does not become liquid upon aging, fertile eggs are sterilized by the application of a high frequency electrostatic field to the egg meat. It has been found that a fertilized egg subjected to the heating effect of an electrostatic field and which is permitted to remain in the field until its temperature is raised to the required degree has its viability destroyed. When a stabilized egg meat is placed in an electrostatic field as herein disclosed, the germ is fully destroyed and the egg meat undergoes no further changes.

An apparatus adapted to perform this invention is shown in the drawings wherein.

Figure 1:
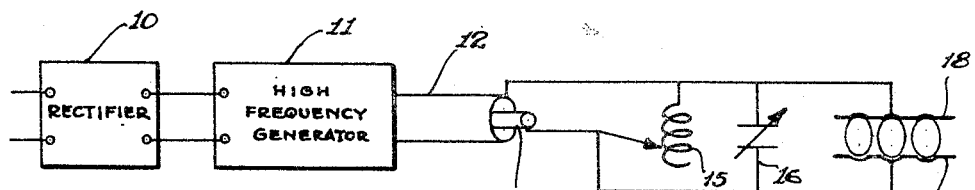
Figure 1 is a diagrammatic layout of the electrical system of this apparatus.

Upon treatment of a shell egg wtih a high frequency electrostatic field, it has been determined that an egg meat subjected to the effects of a dielectric field becomes heated uniformly throughout and its temperature may be raised evenly in the mass without the appearance of any localized heating. The heating effect produced in the egg meat by the high frequency electrostatic field is operative to stabilize the egg white, and to sterilize the egg meat in its shell, if it be fertile, the heating being accomplished without appreciable coagulation of the egg meat.

The use of a high frequency electrostatic field to heat an egg meat effects a stabilization of the egg white so that the white stays firm and does not become runny or liquid upon aging. Normally when an untreated egg is stored for any length of time under the ordinary conditions of cold storage, the albumin breaks down so that the white becomes quite liquid, however, upon pasteurization of an egg meat as here taught, this characteristic of a normal egg white is controlled so that the white does not break down but retains substantially its original firmness.

It has been found that the white of an egg may be stabilized when subjected to a temperature of between 109° F. to 118° F. Since the white tends to coagulate perceptibly when subjected to temperatures as high as 140° F. it is seen that this temperature range is well below that which causes coagulation. The use of a high frequency electrostatic field enables the temperature of the white of an egg meat to be raised without causing the coagulation of any portion of the white. In addition to stabilizing the white, as above described, the application of heat to a fertile egg by means of the high frequency electrostatic field destroys the germ. It has been found that within the temperature range of 109° F. to 118° F. the germ in a fertile egg is destroyed and thus while stabilizing the white, the fertility of an egg may be simultaneously destroyed. It appears that the heat generated within the egg destroys the fertility, however, it may be that the dielectric effect may have some value in contributing to the efficiency with which an electrostatic field destroys the viability of a fertile egg and stabilizes the white.

The advantage of the present invention resides in the feature that the white may be stabilized and the fertility of the egg destroyed by the application of heat without appreciable coagulation of the egg meat of a shell egg. By so treating the egg, it may be prepared for storage without harmful effect whereby the egg retains all of the characteristics of a normal fresh egg and so that it may be used for all purposes of a fresh egg while retaining substantially its original appearance. When an egg treated in accordance with this teaching is stored for considerable periods of time in the usual storage facilities or even without cooling, the characteristics of the fresh egg are retained for much longer periods than is true in an untreated egg and all of these advantages are obtained without producing any noticeable change in the egg meat of the shell egg.

It is to be noted that this invention can be practiced on egg meats broken out from their shell, and either the separated whites or yolks of eggs, but the particular advantage of this process resides in the fact that the egg meat may be pasteurized in the shell. The process has value in this respect for the reason that it is not necessary to break the egg to treat egg meats to prepare them for storage.

To perform this invention, an apparatus such as that diagrammatically shown in Figure 1 may be used. In this apparatus a rectifier 10 of any conventional form may be used to convert a commercial alternating current for use in the high frequency generator 11. The high frequency generator may take any conventional form and should be designed to produce alternating current having a frequency of the order of between 1 to 40 megacycles per second. There are several commercial designs for generators of this type on the market either of which may be adapted to the present use.

A conventional generator designed to operate on a 220 volt, 60 cycle, three phase circuit, or by variation in design in any other circuit, may be used. One commercial generator now available has a rated output of 22,500 B. t. u. per hour, and other units are on the market having a rated output of from 1700 B. t. u to 450,000 B t. u. per hour.

A high frequency generator similar to any of those above described may be utilized for production of a high frequency current of any number of cycles within the range of 1 to 40 megacycles. For the purposes of this invention, the current produced by the generator is delivered through concentrically arranged conductors 12 and 13 to an impedance matching or tuning circuit which includes a variable coil 15 connected in parallel with a variable condenser 16. The current flowing from the tuning circuit is delivered to a condenser made up of plates 18 and 19 between which the egg or eggs to be treated are disposed. When the power is applied to the high frequency generator, a suitable current is delivered to the condenser to establish a high frequency electrostatic field between the plates 18 and 19 of the condenser and, upon placing the egg meats in this field, the dielectric effect causes the heating thereof whereby the temperature of the egg meats is uniformly raised. As above indicated, egg meats either in or out of the shell may be placed in the field, but in preparing eggs for storage, it is particularly desirable to have a method available for pasteurizing the meat of a shell egg.

The egg meat may be pasteurized by being subjected to any electrostatic field produced by an alternating current having a frequency within the range of 1 to 40 megacycles. For the convenience of circuit arrangements and due to the efficiency of conversion, the preferred range is within the lower figures of the range at around 20 megacycles per second. It has been found that egg meats subjected to the uniform application of an electrostatic field, at approximately this frequency, may be rapidly pasteurized. The use of a 15 to 20 megacycle frequency has been found to not only rapidly stabilize the white of an egg but to quickly sterilize a fertile egg without appreciable local coagulation in any portion of the egg meat.

The power input to the field, of course, depends upon the number of egg meats being treated, their size, electrical, and thermal characteristics, the shape of the condenser plates, their spacing from the egg meats, the temperature to which the egg meats are to be raised, etc. In general the power input to the generator required for pasteurization of an egg meat may be estimated from the formula $$P = \frac{0.2110\, n(T_2 - T_1)}{t}$$

where

P is the power in kilowatts, .2110 is a constant, based on the weight of an average egg of 2 oz., having a specific heat of .8, and a 50% overall generator and heat conversion efficiency,
$T_2$ is the final temperature in degrees F.,
$T_1$ is the initial temperature in degrees F.,
$t$ is the time in seconds, and
$n$ is the number of eggs.

Thus for heating one egg from room temperature of 75° F. to 115° F. in 10 seconds, it would require roughly .844 kw.

The electrostatic field produces the best results when it is applied uniformly to the egg meat. The uniform distribution of the dielectric effect produces heat in all portions of the egg meat alike so that no localized hot spots result. The elimination of locally heated areas avoids any coagulation at such points. In order to uniformly distribute the electrostatic field through the egg meat, it has been found that the condenser plates 18 and 19 should be shaped to control the dielectric field. By properly disposing the plates with respect to the egg meats forming the dielectric between the plates, the field can be controlled and a practically uniform distribution of the electrostatic forces can be produced notwithstanding that the egg meat is made up of non-homogeneous material comprising broadly the yolk, white, and shell.

Figure 2:
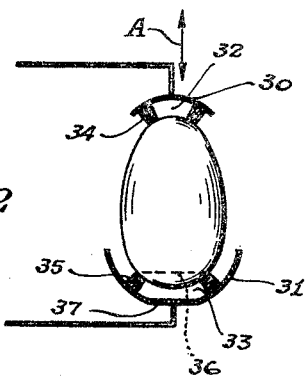
Figure 2 is a sectional side elevation showing the preferred form of a condenser for performing this invention.
Figure 3:
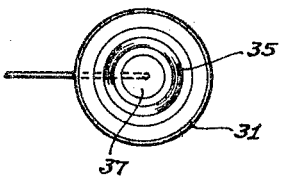
Figure 3 is a plan view of one of the condenser plates shown in Figure 2.

Figure 2 shows a pair of condenser plates 30 and 31 adjustable toward and away from each other, as shown by arrow A, for treating individual shell eggs, which plates are shaped generally to the curvature of the shell of the egg being treated. The shaping of the condenser plates has been found to establish a uniform field through the egg meat in the shell and in the preferred manner of using the shaped plates 30 and 31, the plates are spaced from the shell of the egg to provide air gaps 32 and 33. The plates may be spaced from the shell of the egg by a low loss factor material which will not heat under the specified conditions, such as rings 34 and 35 made of quartz or polystyrene.

The air pockets 32 and 33 function with the shell egg to form a dielectric between plates 30 and 31 in which localized coagulation is avoided. When the condenser plates are applied directly to the surface of a shell egg, the power applied across the plates must be carefully controlled to avoid arcing through the egg meat. When air spaces as 32 and 33 are provided, the composite dielectric properties of the air and egg are such that the necessity for careful control of this power is avoided.

It is essential that the spacers 34 and 35 shall be selected from a material that will not appreciably alter the field distribution in order to avoid localized heating which results if the field is concentrated at any point. The rings should be made of a material which has a very low loss factor to prevent their overheating.

If the spacers do not have this characteristic, the electrostatic field might become concentrated at the point where the spacers touch the egg, thus producing localized heating and coagulation.

Inspection of a normal egg reveals that all eggs have an air cell confined at the large end as at 36 in Figure 2. This air pocket must be taken into consideration in applying an electrostatic field to an egg meat disposed in a shell and in the preferred construction, the condenser plate 31 adapted to cooperate with the larger end of the shell egg, is flattened as at 37 so that the plate is generally equidistant from all portions of the egg meat in the shell. Preferably, also, the egg is to be placed between the plates with its small end down whereby the upper surface of the liquid egg meat will lie in a plane. It is thus obvious that by making the plate 31 with the flattened area 37, it may be placed over the large end of the egg in such a fashion that its surface is approximately parallel with the surface of the egg meat in the shell egg being treated.

Figure 4:
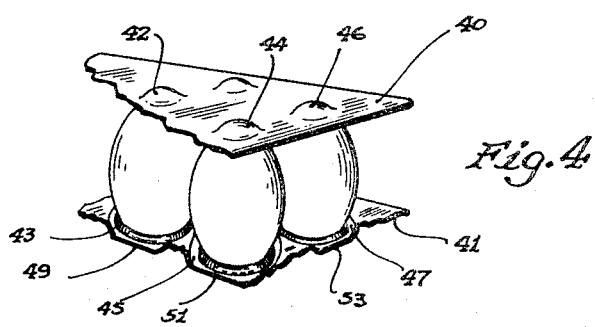
Figure 4 is a modified form of the condenser plate shown in Figure 2.

Figure 4 shows a modified form of condenser plates wherein cooperating plates 40 and 41 are designed to accommodate a plurality of shell eggs. Each of the plates is provided with a given number of dome shaped impressions as 42, 44, 46, and 43, 45, and 47, respectively, which impressions are adapted to be positioned oppositely to each other so that each of the pairs of domes as 42, 43; 44, 45; and 46, 47 is disposed to enclose a shell egg therebetween. Each of the dome shaped impressions is preferably provided with a spacer means so that an air gap is provided between the individual egg shells and the condenser plates in order to distribute the electrostatic field uniformly through the egg meats as discussed above. It will be noted that each of the domed elements 43, 45 and 47 is provided with flattened zones 49, 51 and 53 to distribute the electrostatic field evenly through the meats at the air bubble or large ends.

The plates 40 and 41 are preferably provided with 36 impressions in order to handle a layer of eggs as commercially packed in the usual egg crate. Any other convenient number of impressions may be formed in the plates. Also, one of the plates, preferably 40, may be fixed and plate 41 mounted for rapid adjustment into position over a layer of eggs placed in the impressions of the fixed plate.

The apparatus described above is operative to deliver a high frequency current from the generator through the tuning circuit to the condenser plates shown in either of Figures 2 or 4, to subject shell eggs to a high frequency electrostatic field for pasteurization, stabilization and sterilization. The output from the generator may be delivered to the condenser plates either directly from its output circuit or through a circuit inductively connected to the output circuit of the generator. When the condenser plates are directly connected to the high frequency generator output, the frequency of the electrostatic field may vary as the dielectric condition of the egg changes such as upon the raising of the temperature of the egg meat. On the other hand, when the high frequency current is delivered to the condenser plates through an inductive coupling, the work circuit may be provided with tuning means as here shown to adjust it to be in resonance with the output circuit of the generator in order to obtain maximum efficiency from the generator. The impedance matching or tuning circuit shown in Figure 1, may be associated with the inductive coupling type circuit in order to adjust the frequency in the work circuit as the dielectric condition of the egg meats being treated varies, in order to maintain proper resonance. The tuning circuit may be made to operate either automatically or manually as desired.

In treating egg meats by producing a dielectric effect therein, the treatment should be discontinued at a point where the temperature has been raised sufficiently to effect pasteurization, stabilization and sterilization without coagulation. This has been found to fall within a temperature range of between 109° F. to 118° F. The longer the dielectric field is applied to the egg meat, the greater is the heat that is generated. The heating should be cut short before the temperature which causes coagulation is reached and 118° F. has been found to be sufficiently high to effect all desired changes in the egg meat without causing any perceptible coagulation. In any event, the temperature of the egg meat should not be permitted to rise above 135° F. if perceptible coagulation is to be avoided.

The egg meat being composed of two different phases, namely the white and yolk, presents no particular problem. The two phases have been found to heat up at approximately the same rate. The uniform raising of temperature permits of equalization of the treatment of the yolk and white to stabilize the white and to sterilize the egg meat, without causing coagulation of either portion of the egg. The shell itself apparently has a much higher dielectric constant than the egg meat and thus is not perceptibly heated upon being placed in the dielectric field. These characteristics permit the egg meat of a shell egg to be treated by this process without any waste of energy and by the production of heat in the egg meat where required.

The high frequency generator will usually have an efficiency of upwards of 50 per cent. Coupled with the remarkable decrease in time required to treat a shell egg, together with the improved results obtained in the elimination of perceptible coagulation, the herein disclosed method and apparatus for treating shell eggs is considered to have especial merit. The usual range of frequencies for establishment of heat in dielectric materials may be used.

This invention may be adapted to a continuous operation. All that is required is a condenser means to produce a high frequency electrostatic field and means to move the egg meat through the field. The speed of feeding movement must be related to the field such that the egg meat is disposed in the field for a required period of time to effect the necessary rise in temperature.

It is important to the proper operation of this invention that a uniform dielectric field be produced throughout the egg meat. One manner of accomplishing this result has been described above in connection with the shaping of the condenser plates. When the electrostatic field is applied uniformly to the egg meat, the temperature of the meat is raised uniformly and no temperature differentials exist in the individual egg meats such as would tend to cause localized coagulation. The production of a dielectric effect in the egg meat permits the heating thereof without the production of any temperature differentials in any part of the egg meat and heating continues with consequent rise in temperature only so long as the egg meat remains in the electrostatic field. This means of adding heat to an egg meat permits of a very exact control and is of particular advantage in view of the characteristics of the material being treated. Since the egg meat is usually coagulated by the addition of heat at a temperature in the neighborhood of 140° F., it is essential to control the addition of heat so that the temperature is not unduly raised.

Egg meats treated as herein taught will be found to have their whites stabilized and all fertile eggs will have their viability destroyed. The quantity of power applied to the condenser plates determines the length of time the shell eggs shall be subjected to the high frequency electrostatic field.

Many modifications of this invention will occur to those skilled in the art, all of which are considered to fall within the scope of the following claims.

We claim:

1. A device to pasteurize and stabilize shell eggs by heating the egg meat in its shell without appreciable coagulation comprising means to produce an alternating electrostatic field of the order of between 1 to 40 megacycles per second, said means including a pair of condenser plates disposed oppositely to each other and adjustable toward and away from each other, each of said plates being provided with a plurality of cooperating pairs of impressed shaped portions each of which impressed portion is adapted to generally surround the end of the shell of an egg, each of said plates being associated with the shell eggs to be treated by being spaced therefrom to provide an air gap between the ends of the eggs and each of the impressed portions of the plates, means in the form of a ring concentrically fixed in said impressed portions of the plates, said ring means being formed of a material having a relatively low loss factor as compared with the egg meats to be treated, said ring means each having an internal diameter to engage around the outside surface of the end of an egg to support the egg in a substantially upright position and generally concentrically with respect to the cooperating impressions in the plates, said condenser plates being operative to distribute said field substantially uniformly throughout the individual meats of shell eggs positioned between the impressed portions and between the plates, the meat of said eggs being subjected to the action of said field whereby the egg meat is heated to a pasteurizing temperature.

2. A device to pasteurize and stabilize shell eggs by heating the egg meat in its shell without appreciable coagulation comprising means to produce an alternating electrostatic field of the order of between 1 to 40 megacycles per second, said means including condenser plates shaped generally to follow the periphery of an egg, one of the shaped portions of one of said plates being generally flat across the top to follow the contour of the egg meat in the shell, the flat portion of the one plate being adapted to be associated with a shell egg at the air bubble end, and said condenser plates being associated with said egg by being spaced therefrom to provide an air gap between the egg and each of the plates to distribute said field substantially uniformly throughout the meat of the egg while disposed in its shell, means in the form of a ring concentrically fixed in said impressed portions of the plates, said ring means being formed of a material having a relatively low loss factor as compared with the egg meats to be treated, said ring means each having an internal diameter to engage around the outside surface of the end of an egg to support the egg in a substantially upright position and generally concentrically with respect to the cooperating impressions in the plates, whereby, when an egg is positioned between said plates, said egg meat may be subjected to the action of said field to heat it to a pasteurizing temperature.

WALTER M. URBAIN.
PAUL SCHAUERT.

REFERENCES CITED

The following references are of record in the file of this patent:

UNITED STATES PATENTS

| Number | Name | Date |
|---|---|---|
| 1,163,873 | Thornburgh | Dec. 14, 1915 |
| 1,900,573 | McArthur | Mar. 7, 1933 |
| 1,914,947 | Golden | June 20, 1933 |
| 1,945,867 | Rawls | Feb. 6, 1934 |
| 2,179,261 | Keller | Nov. 7, 1939 |
| 2,341,617 | Hull | Feb. 15, 1944 |
| 2,370,624 | Gillespie | Mar. 6, 1945 |

FOREIGN PATENTS

| Number | Country | Date |
|---|---|---|
| 364,128 | Great Britain | Dec. 28, 1931 |

OTHER REFERENCES

"Illitron" High Frequency Plastic Preheating Equipment. Form 109, copyright 1944, eight pages, particularly pages 4 and 5.

Illinois Tool Works, 2501 N. Keeler Avenue, Chicago 39, Illinois.